Feb. 23, 1943.   L. D. TYSON   2,312,291
THERMOSTATIC CONTROLS FOR MACHINE TOOLS
Filed July 17, 1940   2 Sheets-Sheet 1
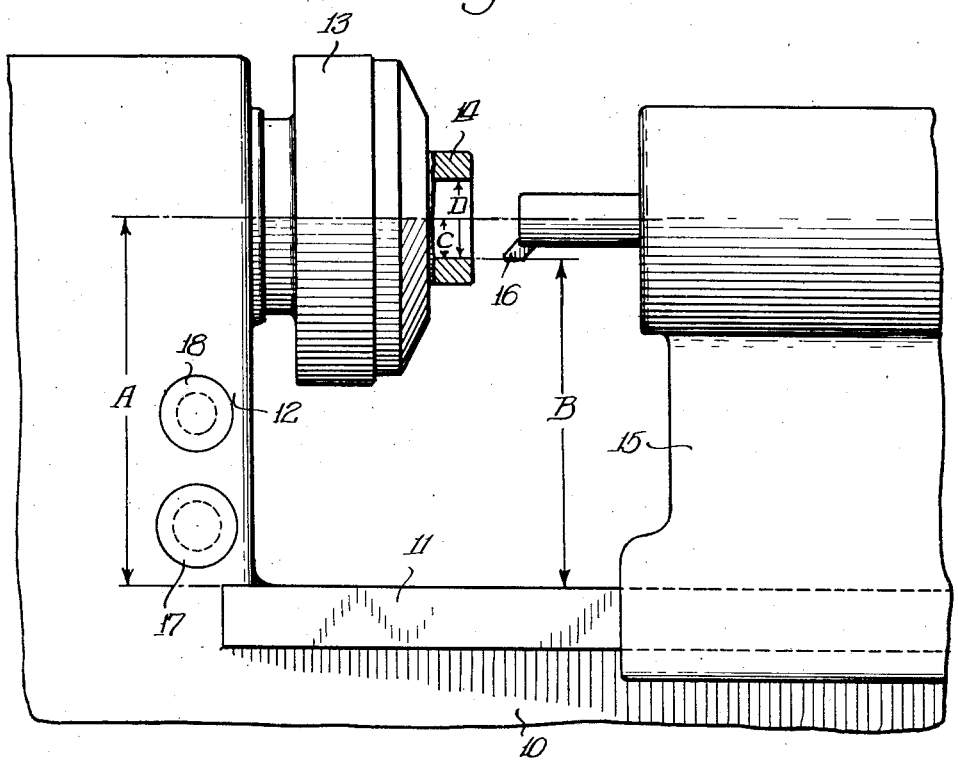
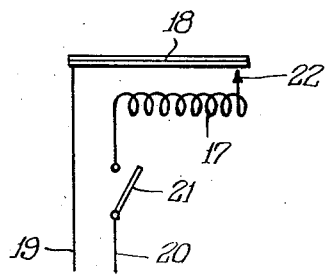
INVENTOR.
Levi D. Tyson,
BY Feb. 23, 1943.                L. D. TYSON                2,312,291
            THERMOSTATIC CONTROLS FOR MACHINE TOOLS
                  Filed July 17, 1940        2 Sheets-Sheet 2
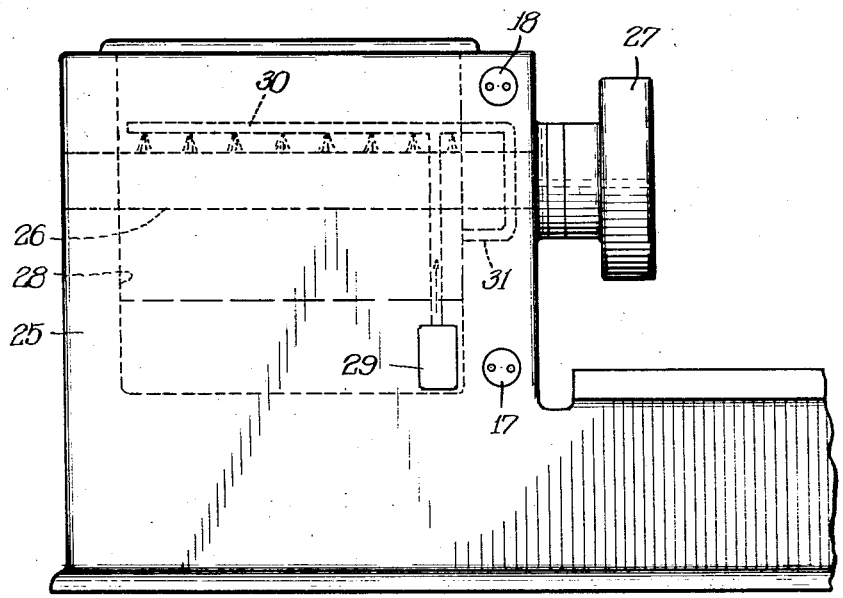
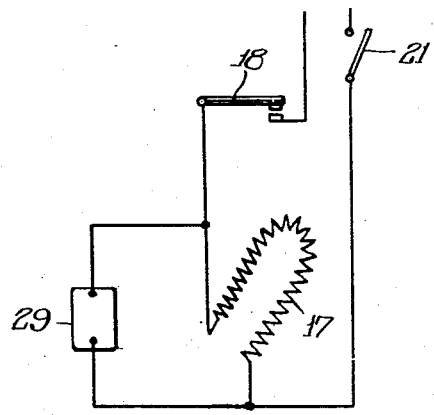
INVENTOR.
Levi D. Tyson,
BY
Wilkinson, Huxley, Byron & Knight
Attys.

Patented Feb. 23, 1943

2,312,291

UNITED STATES PATENT OFFICE 2,312,291

THERMOSTATIC CONTROLS FOR MACHINE TOOLS

Levi D. Tyson, Elkhart, Ind., assignor to International Machine Tool Corporation, a corporation of Indiana Application July 17, 1940, Serial No. 345,922

3 Claims. (Cl. 82—32)

The present invention relates to improvements in thermostatic controls for machine tools.

In machine tools, such for example as lathes, wherein certain movable mechanism cooperates with a fixed mechanism, when such movable mechanism starts from room temperature and is heated by reason of its movement, changes in relative dimensions occur whereby measured settings of the parts are disturbed. The present invention will be described with reference to a lathe, though as the description proceeds it will be clear that it is applicable to many other types of mechanisms.

An object of the present invention is to provide a thermostatic control for machine tools or the like which simplifies the matter of maintaining proper settings between a movable work member and a stationary tool, or, conversely, between a stationary work member and a movable tool.

A further object is to provide machine tool mechanism having instrumentalities for simplifying the preservation of the settings of the parts regardless of whether operations are performed continuously or following a period of idleness of the mechanism.

A further object is to provide machine tool mechanism well adapted to meet the needs of commercial operation.

Further objects will appear as the description proceeds.

Referring to the drawings—

Figure 1 is a view in side elevation of a portion of a lathe embodying the principles of the present invention;

Figure 2 is an electrical diagram illustrating an electrical arrangement which may be employed in the practice of the present invention;

Figure 3 is a view in side elevation of a lathe embodying a slightly different form of the present invention; and Figure 4 is an electrical diagram in connection with the disclosure of Figure 3.

Referring first to Figures 1 and 2, the numeral 10 indicates the bed of a lathe, and the numeral 11 indicates the ways carried by said bed. The numeral 12 indicates the headstock provided with the rotating chuck 13 carrying a rotatable piece of work 14.

The numeral 15 indicates a tailstock provided with the relatively stationary tool 16 adapted for boring a hole in the piece of work 14. The numeral 17 indicates the heating element, and the numeral 18 indicates a thermostat. The electrical circuit of the heating coil 17 and the thermostat 18 may be chosen as desired. Merely for the purpose of illustration, an electrical circuit is indicated in Figure 2, in which one electric wire 19 is connected to the thermostat 18 and the opposite electric wire 20 is connected through the switch 21 to one end of the heating coil 17. Electrical connection between the wires 19 and 20 (assuming the switch 21 to be closed) is controlled by means of the thermostat 18, which is adapted to engage the contact 22 when the thermostat 18 indicates a predetermined temperature but which breaks contact with the contact 22 when a predetermined higher temperature is reached.

The heating coil 17 is located within the headstock 12, preferably adjacent to the bottom of said headstock, and the thermostat 18 is also disposed within said headstock 12, whereby to be responsive to changes in temperature within said headstock.

The mode of operation of the above described embodiment of the present invention will be clear without detailed explanation.

The headstock 12 may be brought to normal running temperature by actually running it, and the thermostat 18 will be adjusted to just break contact with the contactor 22. No further current is used unless the machine is left idle for an extended period, such as over the noon period or over night. Of course, when the machine is to be left idle over a long period, the switch 21 will be opened. When the switch 21 is closed, however (assuming the headstock to be cooler than its operating temperature), the thermostat 18 will engage the contactor 22, completing circuit through the heating coil 17 and bringing the temperature of the headstock up to operating temperature. When the headstock has acquired the desired operating temperature the thermostat 18 will break contact with the contactor 22. The thermostat 18 may be chosen to make and break contact with the contactor 22 to maintain the desired temperature within the desired limits.

In explaining the applicability of the present invention to practical service, it may be pointed out that in Figure 1 the dimension A is the height from the ways to the axis of rotation of the chuck 13, B is the height from the ways to the cutting point of the tool 16, C is the radius of the cut, and D is the diameter of the cut.

The dimension A is changeable, of course, when the headstock varies from room temperature to operating temperature. For example, at room temperature the dimension A may be exactly 10 inches. It may be assumed that the dimension B is 8 inches; then D equals $(10-8) \times 2 = 4.000$ inches. When the machine (not equipped with the present invention) is started from room temperature the bore will be 4.000 inches, but as the machine continues to operate, the headstock develops a running temperature which varies with different machines. Variations of from 50 to 75 degrees are not uncommon. The metal of the headstock therefore expands and the dimension A may increase as much as .005 inch, or even more. The dimension B does not change and remains at 8 inches. Under the conditions just mentioned, D equals (10.005−8) ×2=4.010 inches, which is a serious deviation on many classes of work. Similar errors would occur on turning cuts, and in the case of a reamer it is obvious that a true hole could not be reamed when the reamer gets out of line with the axis of the rotating piece of work. According to prior practice, the operator has been required to change the adjustment of his tool during the entire warming up period, which may be from one to two hours in duration. In the case of reamers, floating holders are used. Both expedients are objectionable.

According to the present invention the difficulties due to expansion of the moving parts have been counteracted. The headstock is brought to normal running temperature, after which the thermostat 18 is adjusted so that it just cuts out the current to the heating element 17. No further current flows until the headstock tends to cool off, in which case, after the temperature has dropped a small amount, the thermostat 18 cuts in the heating coil 17, bringing the headstock 12 back to the normal running condition, at which time the thermostat breaks the circuit of the heating coil 17. The temperature of the headstock is maintained constant within close limitations, and consequently the relative placement of the cutting tool and the work being operated upon is automatically maintained.

Though the above description has been directed more particularly to the matter of preserving the settings in a direction normal to the axis of rotation of the chuck 13, it will be understood, of course, that the temperature control will also preserve the settings in a direction along the axis of the chuck 13.

The embodiment of the present invention illustrated in Figures 3 and 4 provides for the flow of fluid from a region adjacent to the heated portion of the machine to a region of the machine which is to be kept under control. According to the disclosure in Figure 3 the headstock 25 of the machine is provided with the rotatable spindle 26, which carries the chuck 27 at one of its extremities. The headstock 25 is provided with the oil sump 28 having the electrically operated pump 29 for delivering oil or the like to the distributing pipe 30, from which jets of oil are delivered to the spindle 26, any excess oil being delivered through the return pipe 31 to the sump 28. The inlet to the pump 29 will preferably be located adjacent to the heating element 17, thereby receiving the warmest portion of the oil for distribution through the pipe 30.

Figure 4 illustrates an electrical diagram which may be used in connection with the construction shown in Figure 3, the heating element 17 and the electromotive portion of the pump 29 being connected in parallel circuits, one juncture of said parallel circuits being connected to the thermostat 18.

It will be clear without detailed explanation that according to the disclosure in Figures 3 and 4, while the machine is standing at rest and tending to lose temperature the thermostat 18 will become operative (provided the switch 21 is closed) to connect the heater element 17 and the pump 29 in circuit, whereby warm oil will be distributed through the pipe 30 over the spindle 26, maintaining said spindle at the desired temperature. When the machine is operating and consequently no additional heating of the spindle 26 is required, there is no need for operation of the heating element 17 or the pump 29, and consequently when a predetermined temperature has been achieved the thermostat 18 will break its contact, open-circuiting the heating element 17 and the motor of the pump 29. The oil distributing system disclosed in Figures 3 and 4 will, of course, be independent of the usual splash system of lubrication, which will provide the necessary movement of lubricating oil while the machine is in operation.

Though certain preferred embodiments of the present invention has been described in detail, many modifications will occur to those skilled in the art. It is intended to cover all such modifications that fall within the scope of the appended claims.

What is claimed is:

1. In a machine, in combination, a tool member, a work holding member, one of said members being rotatable relative to the other of said members, metallic means for supporting said rotatable member, a heating element for communicating heat to said supporting means, said heating element being operable independently of movement of either of said members and independently of the lubrication system of said machine, and thermostatic means responsive to the temperature of the metal of said supporting means for controlling the operativeness of said heating element.

2. In a lathe, in combination, a headstock, means supported by said headstock for rotatably supporting a piece of work to be operated upon, a tool adapted to operate upon said piece of work, an electric heater element located adjacent to the bottom of said headstock, said heating element being operable independently of movement of either of said members and independently of the lubrication system of said machine, and a thermostat positioned to be responsive to the temperature of the metal of said headstock, said heater element being responsive to said thermostat.

3. In a machine, in combination, cooperating members, one of which is rotatable relative to the other of said cooperating members, means for communicating heat to the region of said rotatable member, said heat communicating means including a heating element and an electrically operated pump for delivering oil or the like from the region of said heating element to the region of said rotatable member, said heating element and said pump being operable independently of movement of either of said members and independently of the lubrication system of said machine, and thermostatic means responsive to temperature conditions in the region of said rotatable member for controlling the operativeness of said heating element and said pump.

LEVI D. TYSON.